(12) United States Patent
Acquista et al.

(10) Patent No.: US 10,454,876 B2
(45) Date of Patent: Oct. 22, 2019

(54) SYSTEMS AND METHODS FOR ASYNCHRONOUS COMMUNICATION

(71) Applicant: AMERICAN EXPRESS TRAVEL RELATED SERVICES COMPANY, INC., New York, NY (US)

(72) Inventors: Lauren B. Acquista, New York, NY (US); Donald R. Bloyer, III, Anthem, AZ (US); Yevgeny Gladun, Chandler, AZ (US); Anish Jacob, Phoenix, AZ (US); Joseph S. Kueser, Chanlder, AZ (US); Mitchel J. Sandlin, Chandler, AZ (US); Mahesh Subramanian, Phoenix, AZ (US); Shelly Yanushpolsky, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 83 days.

(21) Appl. No.: 15/081,010

(22) Filed: Mar. 25, 2016

(65) Prior Publication Data

US 2017/0279758 A1 Sep. 28, 2017

(51) Int. Cl.
*G06F 15/16* (2006.01)
*H04L 12/58* (2006.01)
*H04L 29/08* (2006.01)

(52) U.S. Cl.
CPC ............ *H04L 51/32* (2013.01); *H04L 51/046* (2013.01); *H04L 67/26* (2013.01); *H04L 67/32* (2013.01)

(58) Field of Classification Search
CPC ......... H04L 51/04; H04L 51/20; H04L 51/32; H04L 51/046; H04L 67/26; H04L 67/32

USPC ......................................................... 709/206
See application file for complete search history.

(56) References Cited

U.S. PATENT DOCUMENTS

| 9,491,130 | B1* | 11/2016 | Erickson | H04L 51/20 |
|---|---|---|---|---|
| 2003/0135569 | A1* | 7/2003 | Khakoo | H04L 51/04 709/206 |
| 2010/0325289 | A1* | 12/2010 | Dostal | H04L 12/1818 709/227 |
| 2013/0174061 | A1* | 7/2013 | Loganathan | H04L 51/04 715/758 |
| 2015/0006651 | A1* | 1/2015 | Chmara | H04L 51/04 709/206 |

(Continued)

OTHER PUBLICATIONS

P. Saint-Andre, "Streaming XML with Jabber/XMPP," in IEEE Internet Computing, vol. 9, No. 5, pp. 82-89, Sep.-Oct. 2005. (Year: 2005).*

(Continued)

*Primary Examiner* — Taylor A Elfervig
(74) *Attorney, Agent, or Firm* — Snell & Wilmer, L.L.P.

(57) ABSTRACT

A system may receive a first message transmitted over a network from a first device. A first invitation to join a text-based communication channel may be transmitted to the first device in response to the first message. A second invitation may be transmitted to a second device to join the text-based communication channel with the server configured to retain context of the text-based communication channel. The system may receive a second message transmitted from the second device and may transmit a third invitation to the first device to join the text-based communication channel in response to the second message.

20 Claims, 3 Drawing Sheets

(56) References Cited

U.S. PATENT DOCUMENTS

| | | | | |
|---|---|---|---|---|
| 2015/0177974 A1* | 6/2015 | Lu | ............... | G06F 3/04847 715/752 |
| 2015/0295955 A1* | 10/2015 | Cholkar | ............. | H04L 65/1066 709/204 |
| 2015/0312176 A1* | 10/2015 | Jones | ............... | H04L 51/04 709/206 |

OTHER PUBLICATIONS

N. L. Robert, J. Macker, D. Millar, C. R. William and I. Taylor, "XO: XMPP overlay service for distributed chat," 2010—MILCOM 2010 Military Communications Conference, San Jose, CA, 2010, pp. 1116-1121. (Year: 2010).*

D. Gomes, J. M. Gonçalves, R. O. Santos and R. Aguiar, "XMPP based Context Management Architecture," 2010 IEEE Globecom Workshops, Miami, FL, 2010, pp. 1372-1377. (Year: 2010).*

* cited by examiner

SYSTEMS AND METHODS FOR ASYNCHRONOUS COMMUNICATION

FIELD

The present disclosure relates to systems and methods for asynchronous communication using text-based chat.

BACKGROUND

Customer service platforms may interact with customers using synchronous communication channels or asynchronous channels. However, current systems are not typically equipped to allow for the option between synchronous and asynchronous interactions.

Synchronous channels (e.g., voice communication or chat windows) operate with both parties present at the time of communication. For synchronous communication channels, customers encounter problems such as waiting on hold, being available for a call back, dropping calls, or otherwise providing their undivided attention to the customer service representative on the other end.

Furthermore, customer service platforms may connect and disconnect customers and service agents on a synchronous basis while both parties are present. After one or more parties disconnect the context of the communication such as text history and timestamps, for example, may be lost. A customer may have to rehash previous communication and otherwise update a new service representative with each connection.

Asynchronous channels such as email allow communication with the parties present over varying time periods. However, asynchronous communication channels may cause the customer inconveniences such as long delay time between communications, particularly when the customer is looking for a fast answer.

SUMMARY

A system, method, and computer readable medium (collectively, the "system") is disclosed for communicating with selectively asynchronous and synchronous communication channels. In various embodiments, the system may receive a first message transmitted over a network from a first device. A first invitation to join a text-based communication channel may be transmitted to the first device. A second invitation may be transmitted to a second device to join the text-based communication channel, while the server is configured to retain the context of the text-based communication channel. The system may receive a second message transmitted from the second device and may transmit a third invitation to the first device to join the text-based communication channel, in response to the second message.

In various embodiments, the third invitation transmitted by the system may include a push notification. The system may retrieve the context of the text-based communication channel in response to the second message and may transmit the context of the text-based communication channel to the first device and/or or the second device. The text-based communication channel may be, for example, an XMPP room. Context of the text-based communication channel may include details such as text history, a timestamp, or a user name. The system may transmit the third invitation by communicating with an application and/or a web-based application running on the first device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems and methods for asynchronous and synchronous communication disclosed herein enable customers to selectively use synchronous or asynchronous channels for text-based communication. Customer service representatives may also re-engage customers in-channel (i.e., the channel in which communication started) as the customer service representative becomes available using presently disclosed systems. Past communication histories may be maintained so that any customer service representative that picks up a case can have the up-to-date communication history and provide further assistance in the context of past conversations. Thus, customer service providers are able to communicate contextually, conveniently, and instantly with consumers at the convenience of consumers.

Figure 1:
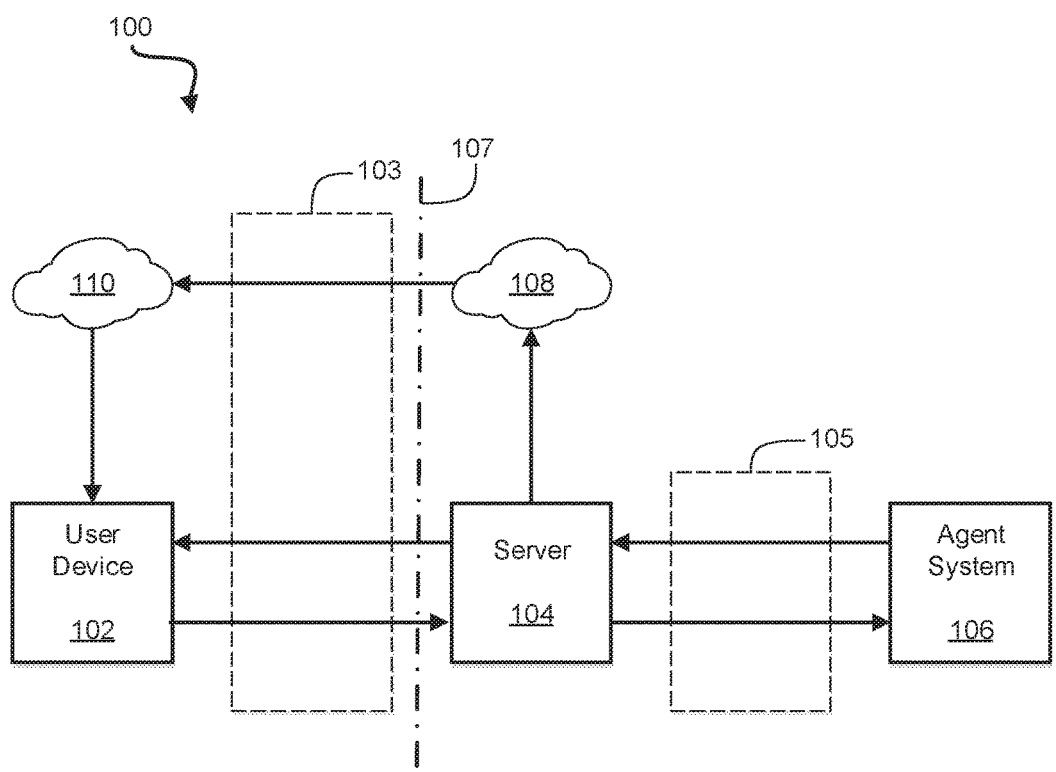
FIG. 1 illustrates an exemplary system for synchronous and asynchronous chat communications between a customer and a customer service representative, in accordance with various embodiments.

With reference to FIG. 1, system 100 for text-based communication is shown, in accordance with various embodiments. System 100 facilitates text-based communication between user device 102 and agent device 106 with server 104 acting as an intermediary. User device 102, server 104, and/or agent device 106 may be any electronic device (e.g., personal computing device/mobile communication device) which communicates via any network and/or via a short-range wireless protocol such as, for example, Bluetooth® or an IEEE 802.11 standard. A web client or dedicated application may be associated with and/or used by any combination of user device 102, agent device 106, server 104. In this regard, a web client may comprise a variety of browsing software or browser applications (e.g., Microsoft Internet Explorer, Mozilla Firefox, Google Chrome, Apple Safari, a dedicated micro-application, or any other suitable software packages available for communicating over a network 103, network 105, and/or other communication channels). Such browser applications may comprise network-capable software installed within a computing unit or a system to conduct online transactions and/or communications. These computing units or systems may take the form of a computer or processor, or a set of computers/processors, although other types of computing units or systems may be used, including laptops, notebooks, servers, hand held computers, personal digital assistants, cellular phones, smart phones (e.g., iPhone®, BlackBerry®, Droid®, etc.) tablets such as iPads, wearable computing devices such as smart watches or smart glasses, or any suitable device capable of receiving data over network 103 and/or network 105.

As those skilled in the art will appreciate, a customer or merchant device may include an operating system (e.g., Windows NT, 95/98/2000/CE/Mobile, OS2, UNIX, Linux, Solaris, iOS, etc.) as well as various conventional support software and drivers typically associated with computers. A customer or merchant device may implement security protocols such as Secure Sockets Layer (SSL) and Transport Layer Security (TLS) for communication over a network. Any device used in system 100 may also implement one or more application layer protocols, including, for example, HTTP, HTTPS, FTP, XMPP, and/or SFTP.

In various embodiments, server 104 may be configured to provide messaging, presence, and routing features. In that regard, server 104 may comprise an XMPP (extensible messaging and presence protocol) server having extended functionality beyond standard XMPP functionality. Systems and methods of the present disclosure may thus implement XMPP and accompanying functionality as documented at http://xmpp.org/rfcs/, which is hereby incorporated by reference in its entirety. The XMPP systems implemented on server 104 may extend the XMPP protocol to implement the functionality described in greater detail below. The extended XMPP protocol may enable server 104 to provide both asynchronous and synchronous text-based communication between a customer using user device 102 and a customer service representative using agent system 106. Server 104 may also operate as a chat server using a custom protocol that does not extend XMPP.

In various embodiments, user device 102 may send and receive messages over network 103 with server 104. Network 103 and/or network 105 may include a wide area network, such as the Internet, or local area network. Network 103 and/or network 105 may also include other communication channels such as Bluetooth® or IEEE 802.11 standards, for example.

In various embodiments, server 104 may also send notification messages to service provider push notification services 108. Service provider push notification services and server 104 may both be behind a firewall 107 relative to network 103. Service provider push notification services 108 may then send the push notification message to user device push notification services 110. If appropriate, user device push notification services 110 may send a push notification to user device 102. Server 104 may further communicate with agent device 106 over network 105. Agent system 106 may also be behind firewall 107 relative to network 103.

Firewall 107 may include any hardware and/or software suitably configured to protect server 104, agent device 106, and any other components operated by components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may be integrated as software within an Internet server, any other application server components or may reside within another computing device or may take the form of a standalone hardware component.

Figure 2:
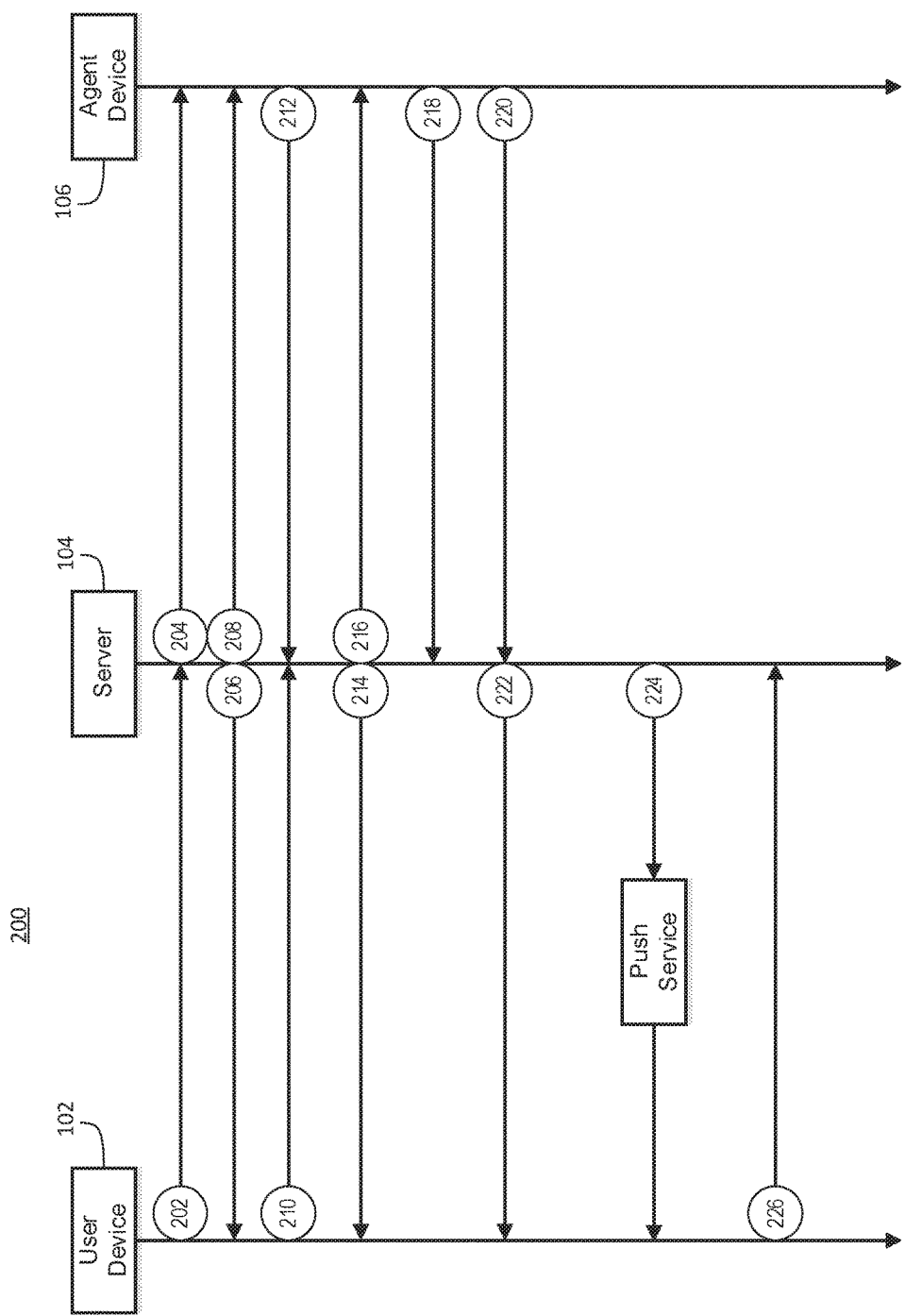
FIG. 2 illustrates an exemplary process for executing selectively synchronous or asynchronous communication between a customer and customer service representative, in accordance with various embodiments.

Referring now to FIG. 2, process 200 for providing asynchronous and/or synchronous text-based communication on a system similar to system 100 of FIG. 1 is shown, in accordance with various embodiments. A customer may send a message to server 104 (Step 202). User device 102 may send the message to server 104 using a text-based communication protocol such as, for example, XMPP. In response to receiving the message from the user device 102, server 104 may send an indication to agent device 106 that a customer requested text communication (Step 204).

In various embodiments, server 104 may invite user device 102 to enter a text-based communication channel with an agent (Step 206). Server 104 may send the invitation over network 103. The invitation may include a push notification on user device 102 using the push notification services described with reference to FIG. 1. Server 104 may maintain the text-based communication channel and keep a history of text-based communications sent over the communication channel. As used herein, a "text-based communication channel" may refer to an XMPP room (or any suitable type of XMPP object) configured to retain context of the communications sent on the channel. For example, context may include time stamps, user names, historic messages, users joining the channel, users leaving the channel, or other information that at least partially captures the state of previous communication on the channel. The context may be retained by server 104 across connects, disconnects, and/or reconnects. Server 104 may store context and text-based communication channels using, for example, a database and/or an extended XMPP class.

In various embodiments, server 104 may also invite agent device 106 to enter the text-based communication channel with a user (Step 208). Server 104 may transmit the invitation to agent device 106 over network 105. The invitations may be distributed to user device 102 and/or agent device 106 in any order. User device 102 may join the text-based communication channel (Step 210). Agent device 106 may also join the text-based communication channel (Step 212). Agent device 106 and/or user device 102 may join the text-based channel in various orders such as, for example, user device 102 first, agent device 106 first, or concurrently.

In various embodiments, server 104 may detect user device 102 in the text-based communication channel and agent device 106 in the text-based communication channel.

In response to both user device 102 and agent device 106 detected in the channel, server 104 may provide synchronous text-based communication between user device 102 and agent device 106. User device 102 and agent device 106 may communicate in real-time across the open text-based communication channel maintained by server 104.

In various embodiments, user device 102 may leave the text-based communication channel (Step 214). User device 102 may leave the channel in response to closing an application running on user device 102 that provided the interface to the text-based communication channel. User device 102 may also leave the channel in response to user device 102 power cycling. User device 102 may also leave the channel in response to closing the channel using an in-application interface. In response to user device 102 leaving the channel, server 104 may retain the text history of text-based communication sent across the channel as well as any other context associated with the text-based communication sent across the channel. Server 104 may also retain an identifier for user device 102 such as a device ID, MAC address, device signature, telephone number, or other device identification. Server 104 may reconnect user device 102 to the text-based communication channel containing the text history of the channel. Server 104 may also retain user identifier associated with the text-based communication channel, such as a user name, to reconnect the user to the text-based communication channel in response to the user logging in to a user device 102.

In various embodiments, agent device 106 may leave the text-based communication channel (Step 216). Server 104 may retain the text history of text-based communication sent across the channel in response to agent device 106 leaving the channel.

In various embodiments, agent device 106 may re-join the text-based communication channel maintained by server 104 (Step 218). Agent device may re-join the text-based communication channel instantaneously after leaving the channel, an hour after leaving the channel, a day after leaving the channel, a week after leaving the channel, or any other time period after leaving the channel. A predetermined time may be set after which a dormant text-based communication channel may be reset or deleted. Text-based communication channels may also be retained indefinitely and made available for re-joining by user device 102 and/or agent device 106 as well as archiving.

In various embodiments, agent device 106 may send a message to a user and/or user device 102 (Step 220). In response to receiving the message from agent device 106, server 104 may reinitialize the text-based communication channel. Re-initialization may include retrieving and/or transmitting the text communication history of the text-based communication channel. Reinitializing may also include reestablishing connections to agent device 106 and/or user device 102. Reestablishing connections to agent device 106 and/or user device 102 may include opening a TCP connection to agent device 106 and/or user device 102. In that regard, server 104 may establish a secure electronic communication connection to user device 102 and/or agent device 106.

In various embodiments, server 104 may invite a user and/or user device 102 to join the text-based communication channel in response to the user being logged in to an application running on user device 102 configured to interface with the text-based communication channel (Step 222). Server 104 may invite the user and/or user device 102 to join the text-based communication channel in response to the user being logged in to a web-based application running on a browser of user device 102 and configured to interface with the text-based communication channel. Server 104 may extend the invitation by sending a message over the application or web-based application that the text-based communication channel is available for asynchronous communication.

In various embodiments, server 104 may invite user and/or user device 102 to join the text-based communication channel in response to a user being logged out of an application, the application being closed, the user device being powered down, or user and/or user device 102 being otherwise unavailable (Step 224). The invitation may be extended using push services such as service provider push notification services 108 and/or user device push notification services 110 of system 100.

In various embodiments, the user and/or user device 102 may join the text-based communication channel in response to an invitation (e.g., the invitation of step 222 and/or the invitation of step 224). User device 102 may reengage in electronic communication with server 104 and agent device 106 by joining the previously retained text-based communication channel provided by server 104.

Figure 3:
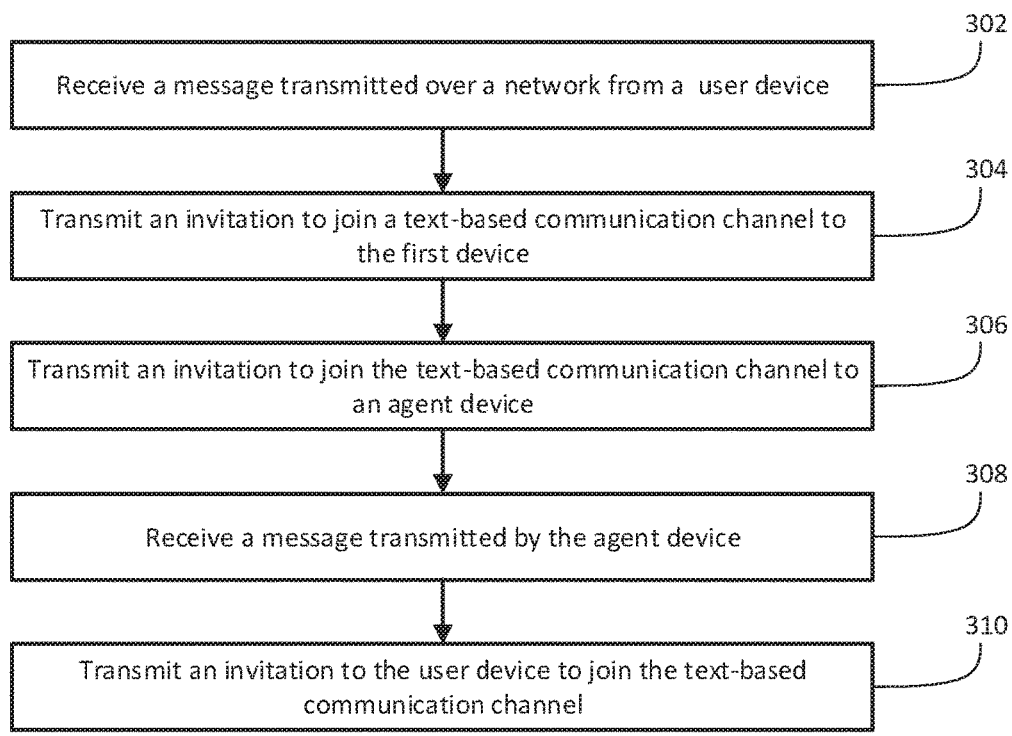
FIG. 3 illustrates an exemplary process for a server to provide a text-based communication channel having persistent context, in accordance with various embodiments.

Referring now to FIGS. 1 and 3, a process 300 for providing text-based communication with persistent context between two or more electronic devices is shown, in accordance with various embodiments. Process 300 may be executed by server 104 of system 100, for example. Server 104 may receive a message transmitted over network 103 from a user device 102 (Step 302). Server 104 may be operating as an XMPP server and receive the message using XMPP. In response to receiving the message, server 104 may create a text-based communication channel (e.g., an XMPP room). Communication on the text-based channel may be written to the XMPP room. In that regard, in response to a party joining the text-based communication channel (e.g., the XMPP room), communications previously written to the text-based communication channel may be available for the party to review. For text-based communication channels based on XMPP, XMPP classes may be extended to provide the contextual retention behavior and/or room queuing behavior.

In various embodiments, server 104 may transmit an invitation to join the text-based communication channel to the first device (Step 304). The invitation may include a push notification, a greeting message, automatically joining the first device to the text-based communication channel, or another suitable response from server 104. Server 104 may also transmit an invitation to a second device to join the text-based communication channel (Step 306). In that regard, server 104 may initiate communication using synchronous communication with the first device and the second device present in the text-based communication channel. The server may retain context of the text-based communication channel such as prior messages, time stamps, user names of connecting and/or disconnecting parties, and other suitable historic context. In that regard, context may persist through connection and disconnection of parties such that the context may be regenerated and revisited upon subsequent connections. The first device and/or second device may disconnect from the text-based communication channel. After the devices disconnect server 104 may continue to retain context of communications over the text-based communication channel so that parties may join and/or re-join the channel at a later time.

In various embodiments, the server may receive a message transmitted from the second device (Step 308). The message from the second device may be an asynchronous message to the first device or the user of the first device (e.g., the first device may be disconnected from the text-based communication channel, or the user of the first device may have the interface to the communication channel minimized). The message from the second device may be a synchronous message if the user is presently focused on an application interfacing with the text-based communication channel (e.g., the user has not disconnected).

In various embodiments, server 104 may transmit an invitation to the first device to join or re-join the text-based communication channel in response to the second message (Step 310). The invitation may include a push notification using service provider push notification service 108 and/or user device push notification services 110. The invitation may also include a message transmitted by server 104 to an application and/or web-based application running on the first device. Server 104 may also retrieve the context of the text-based communication in response to the message for transmitting to the first device and/or the second device.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with", "identified with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Phrases and terms similar to an "party" may include any individual, consumer, customer, customer service agent, customer service provider, group, business, organization, government entity, transaction account issuer or processor (e.g., credit, charge, etc.), merchant, consortium of merchants, account holder, charitable organization, software, hardware, and/or any other type of entity.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via a text-based communication channel.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine." an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, wireless IEEE 802.11 wireless chip, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, server 104 may include application servers (e.g. WEB SPHERE, WEB LOGIC, JBOSS). In various embodiments, the server may include web servers (e.g. APACHE, IIS, GWS, SUN JAVA®, SYSTEM WEB SERVER).

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem. Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.). MICROSOFT® Access® or MICROSOFT®, SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be used for communication over network 103 and/or network 105. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the user device 102 and/or agent device 106 may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNLX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998): (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The user has user devices 102 in the form of personal computers, laptops, notebooks, hand held computers, set-top boxes, cellular telephones, touch-tone telephones and the like. The service provider has computing units implemented in the form of a server 104 and/or agent device 106, although other implementations are contemplated by the system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises". "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a server, a first message transmitted over a network from a first device;
   notifying, by the server, a second device that the first device is waiting to communicate with the second device;
   transmitting, by the server and to the first device, a first invitation to join a text-based communication channel;
   transmitting, by the server and to the second device, a second invitation to join the text-based communication channel;
   joining, by the server, the first device to the text-based communication channel;
   joining, by the server, the second device to the text-based communication channel;
   receiving, by the server, text-based communications from the first device and the second device using an Xml Message and Presence Protocol (XMPP);
   creating, by the server, an XMPP room in response to receiving the text-based communications using the XMPP;
   writing, by the server, the text-based communications to the XMPP room;
   retaining, by the server, a context of the text-based communication channel;
   releasing, by the server, the first device from the text-based communication channel;
   releasing, by the server, the second device from the text-based communication channel;
   retaining, by the server, a first identifier for the first device and a second identifier for the second device;
   receiving, by the server and from the second device, new text-based communications;
   re-initiatializing, by the server and in response to receiving the new text-based communications, the text-based communication channel using the second identifier;
   re-generating, by the server, the context of the text-based communication channel using the first identifier and the second identifier, such that the context is available for review;
   writing, by the server, the new text-based communications to the XMPP room such that the context is available for review in the XMPP room;
   extending, by the server, XMPP classes for providing an extended XMPP;
   providing, by the server, contextual retention behavior using the extending of the XMPP classes;
   providing, by the server, room queuing behavior using the extending of the XMPP classes;
   re-joining, by the server, the second device to the text-based communication channel by opening a TCP connection to the second device;
   transmitting, by the server, a re-initializing message from the second device to the first device via the text-based communication channel;

determining, by the server, whether the first device has logged out of or has logged into the text-based communication channel;
transmitting, by the server and to the first device, a third invitation using a push notification to join the text-based communication channel, in response to the determining that the first device has logged out;
transmitting, by the server and to the first device, a fourth invitation to join the text-based communication channel, in response to the determining that the first device has logged in;
receiving, by the server and from the first device, a request to join the text-based communication channel;
re-joining, by the server, the first device to the text-based communication channel in the XMPP room by opening the TCP connection to the first device; and
providing, by the server and to the first device, the new text-based communications to the first device for review.

2. The method of claim 1, wherein at least one of (i) the text-based communication channel between the first device and the server uses the XMPP, or (ii) the text-based communication channel between the second device and the server uses the XMPP.

3. The method of claim 1, wherein the releasing of the first device is in response to the first device being unavailable.

4. The method of claim 1, further comprising transmitting, by the server, the context of the text-based communication channel to at least one of the first device or the second device.

5. The method of claim 1, wherein first messages are delivered synchronously in response to both the first device and the second device being available, and second messages are delivered asynchronously when either one of the first device or the second device are unavailable.

6. The method of claim 1, wherein the context comprises at least one of a text history, a timestamp, or a user name.

7. The method of claim 1, wherein the server communicates with the first device via at least one of an application or a web-based application running on the first device.

8. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a first message transmitted over a network from a first device;
notifying, by the processor, a second device that the first device is waiting to communicate with the second device;
transmitting, by the processor and to the first device, a first invitation to join a text-based communication channel;
transmitting, by the processor and to the second device, a second invitation to join the text-based communication channel;
joining, by the processor, the first device to the text-based communication channel;
joining, by the processor, the second device to the text-based communication channel;
receiving, by the processor, text-based communications from the first device and the second device using an Xml Message and Presence Protocol (XMPP);
creating, by the processor, an XMPP room in response to receiving the text-based communications using the XMPP;
writing, by the processor, the text-based communications to the XMPP room;
retaining, by the processor, a context of the text-based communication channel;
releasing, by the processor, the first device from the text-based communication channel;
releasing, by the processor, the second device from the text-based communication channel;
retaining, by the processor, a first identifier for the first device and a second identifier for the second device;
receiving, by the processor and from the second device, new text-based communications;
re-initiatializing, by the processor and in response to receiving the new text-based communications, the text-based communication channel using the second identifier;
re-generating, by the processor, the context of the text-based communication channel using the first identifier and the second identifier, such that the context is available for review;
writing, by the processor, the new text-based communications to the XMPP room such that the context is available for review in the XMPP room;
extending, by the processor, XMPP classes for providing an extended XMPP;
providing, by the processor, contextual retention behavior using the extending of the XMPP classes;
providing, by the processor, room queuing behavior using the extending of the XMPP classes;
re-joining, by the processor, the second device to the text-based communication channel by opening a TCP connection to the second device;
transmitting, by the processor, a re-initializing message from the second device to the first device via the text-based communication channel;
determining, by the processor, whether the first device has logged out of or has logged into the text-based communication channel;
transmitting, by the processor and to the first device, a third invitation using a push notification to join the text-based communication channel, in response to the determining that the first device has logged out;
transmitting, by the processor and to the first device, a fourth invitation to join the text-based communication channel, in response to the determining that the first device has logged in;
receiving, by the processor and from the first device, a request to join the text-based communication channel;
re-joining, by the processor, the first device to the text-based communication channel in the XMPP room by opening the TCP connection to the first device; and
providing, by the processor and to the first device, the new text-based communications to the first device for review.

9. The computer-based system of claim 8, wherein at least one of (i) the text-based communication channel between the first device and the processor uses the XMPP, or (ii) the text-based communication channel between the second device and the processor uses the XMPP.

10. The computer-based system of claim 8, wherein the releasing of the first device is in response to the first device being unavailable.

11. The computer-based system of claim 8, further comprising transmitting, by the processor, the context of the text-based communication channel to at least one of the first device or the second device.

12. The computer-based system of claim 8, wherein first messages are delivered synchronously in response to both the first device and the second device being available, and second messages are delivered asynchronously when either one of the first device or the second device are unavailable.

13. The computer-based system of claim 8, wherein the context comprises at least one of a text history, a timestamp, or a user name.

14. The computer-based system of claim 8, wherein the processor communicates with the first device via at least one of an application or a web-based application running on the first device.

15. An article of manufacture including a non-transitory, tangible computer readable storage medium having instructions stored thereon that, in response to execution by a processor, cause the processor to perform operations comprising:

receiving, by the processor, a first message transmitted over a network from a first device;

notifying, by the processor, a second device that the first device is waiting to communicate with the second device;

transmitting, by the processor and to the first device, a first invitation to join a text-based communication channel;

transmitting, by the processor and to the second device, a second invitation to join the text-based communication channel;

joining, by the processor, the first device to the text-based communication channel;

joining, by the processor, the second device to the text-based communication channel;

receiving, by the processor, text-based communications from the first device and the second device using an Xml Message and Presence Protocol (XMPP);

creating, by the processor, an XMPP room in response to receiving the text-based communications using the XMPP;

writing, by the processor, the text-based communications to the XMPP room;

retaining, by the processor, a context of the text-based communication channel;

releasing, by the processor, the first device from the text-based communication channel;

releasing, by the processor, the second device from the text-based communication channel;

retaining, by the processor, a first identifier for the first device and a second identifier for the second device;

receiving, by the processor and from the second device, new text-based communications;

re-initiatializing, by the processor and in response to receiving the new text-based communications, the text-based communication channel using the second identifier;

re-generating, by the processor, the context of the text-based communication channel using the first identifier and the second identifier, such that the context is available for review;

writing, by the processor, the new text-based communications to the XMPP room such that the context is available for review in the XMPP room;

extending, by the processor, XMPP classes for providing an extended XMPP;

providing, by the processor, contextual retention behavior using the extending of the XMPP classes;

providing, by the processor, room queuing behavior using the extending of the XMPP classes;

re-joining, by the processor, the second device to the text-based communication channel by opening a TCP connection to the second device;

transmitting, by the processor, a re-initializing message from the second device to the first device via the text-based communication channel;

determining, by the processor, whether the first device has logged out of or has logged into the text-based communication channel;

transmitting, by the processor and to the first device, a third invitation using a push notification to join the text-based communication channel, in response to the determining that the first device has logged out;

transmitting, by the processor and to the first device, a fourth invitation to join the text-based communication channel, in response to the determining that the first device has logged in;

receiving, by the processor and from the first device, a request to join the text-based communication channel;

re-joining, by the processor, the first device to the text-based communication channel in the XMPP room by opening the TCP connection to the first device; and providing, by the processor and to the first device, the new text-based communications to the first device for review.

16. The article of claim 15, wherein at least one of (i) the text-based communication channel between the first device and the processor uses the XMPP, or (ii) the text-based communication channel between the second device and the processor uses the XMPP.

17. The article of claim 15, wherein the releasing of the first device is in response to the first device being unavailable.

18. The article of claim 15, wherein first messages are delivered synchronously in response to both the first device and the second device being available, and second messages are delivered asynchronously when either one of the first device or the second device are unavailable.

19. The article of claim 15, wherein the context comprises at least one of a text history, a timestamp, or a user name.

20. The article of claim 15, wherein the processor communicates with the first device via at least one of an application or a web-based application running on the first device.

* * * * *